Jan. 30, 1968 R. SMULKA 3,366,752
CONTROL APPARATUS
Filed Feb. 25, 1966
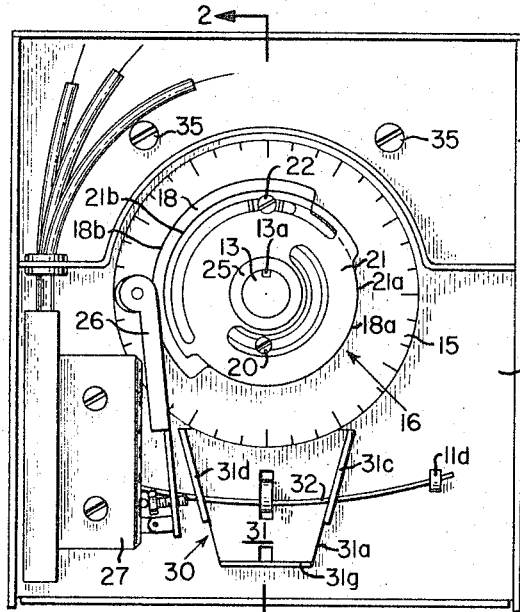
Fig. 1
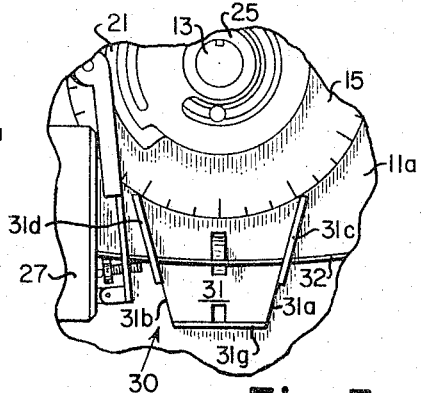
Fig. 3
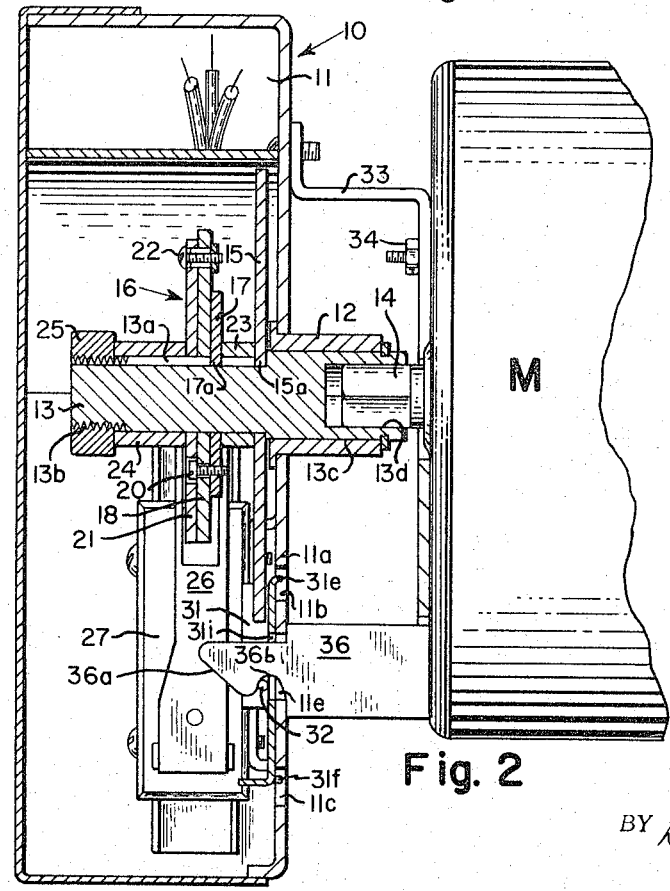
Fig. 2
Fig. 4
INVENTOR.
ROMAN SMULKA
BY [signature]
ATTORNEY

United States Patent Office 3,366,752
Patented Jan. 30, 1968

3,366,752
CONTROL APPARATUS
Roman Smulka, Minneapolis, Minn., assignor to Honeywell Inc., Minneapolis, Minn., a corporation of Delaware
Filed Feb. 25, 1966, Ser. No. 530,176
9 Claims. (Cl. 200—38)

ABSTRACT OF THE DISCLOSURE

An auxiliary switch apparatus for mounting on a motor by means of a mounting bracket and having a rotatable shaft driven by the motor and carrying the switch operating cams, the switch apparatus including a spring biased brake which prevents undesired rotation of the shaft when the apparatus is removed from the motor and the mounting bracket including an element which cooperates with the brake when the switch apparatus is mounted on the motor and provides the dual function of disabling the brake and releasably latching the switch apparatus to the motor.

This invention relates to control apparatus and more specifically to an improvement in a control device of the type wherein a rotatable member is adapted to be driven by a motor and wherein there is provided brake means for preventing undesirable rotation of the rotatable member. In particular, this invention provides manually releasable brake means which normally cooperate with the rotatable member to prevent rotation thereof when the member is not operably connected to the driving motor and provides means for automatically moving the brake means to an inactive position and maintaining it inactive when the rotatable member is operably connected to the driving motor.

This invention may find use in various types of control devices but is particularly useful in devices of the type wherein a rotatable shaft carries a plurality of cams for operating switches, valves or the like and wherein the shaft is adapted to be operably connected to a driving motor and driven thereby. In devices of this type provision is generally made for adjustment of the operating cams, preferably when the shaft is operably disconnected from the motor so that it is readily rotatable for adjustment purposes. Since it is usually necessary to adjust a plurality of cams with respect to each other as well as with respect to the shaft, dfficulty has been encountered in holding all of these elements in the desired position so that they can be secured by a set screw or other fastening means. This invention provides brake means which is movable between an active position wherein it prevents undesired rotation of the shaft and an inactive position where it does not interfere with rotation of the shaft so that the shaft can be rendered readily rotatable when necessary during an adjustment. Since it is important that the brake be rendered inoperative when the shaft is operably connected to the motor, so that damage to the device will not occur, this invention provides means for automatically moving the brake means to its inactive position and maintaining it in that position when the shaft is operably connected to the motor.

Various objects and advantages of my invention will become apparent to those skilled in the art upon reading the following detailed description of a preferred embodiment thereof wherein reference is made to the accompanying drawing.

In the drawing:

FIGURE 1 is a front view of a motor driven switch operating control device utilizing a brake means constructed according to my invention and disclosing the brake means in its inactive position;

FIGURE 2 is an enlarged cross-sectional view taken generally along line 2—2 of FIGURE 1;

FIGURE 3 is a fragmentary view of the device of FIGURE 1 but disclosing the brake means in its active position; and FIGURE 4 is an enlarged side view of a brake member which forms a part of the invention.

Referring to the drawing, numeral 10 generally designates a control device which utilizes my invention. The device includes a housing 11 having a base or main wall 11a. Wall 11a supports a bearing 12 in which a shaft 13 is rotatably mounted. Shaft 13 includes a portion which extends into the housing and has formed therein a longitudinal slot 13a and further has adjacent its end a threaded portion 13b. Outside of the housing, on the opposite side of bearing 12, shaft 13 includes an enlarge portion 13c which has formed therein an axially extending, non-round opening 13d which is adapted to accept a cooperating non-round output shaft 14 of a driving motor M, a portion of which is shown in FIGURE 2. This non-round opening and output shaft form a driving connection and establish the relative angular positions between shaft 13 and the motor shaft. A disc or index wheel 15 is carried by shaft 13, inside housing 11, and is angularly fixed with respect thereto as by a tab 15a which extends into slot 13a. Index wheel 15 may be provided with indicia to indicate the angular position of shaft 13 with respect to housing 11.

Also mounted on shaft 13, forward of disc 15, is a switch operating cam assembly 16. Assembly 16 may include a disc 17 connected to shaft 13 by a tab 17a disposed in slot 13a, a first cam member 18 which is adjustably connected to disc 17 by appropriate means such as a screw 20, and a second cam member 21 which is adjustably connected to cam member 18 by appropriate means such as a screw 22. Cam assembly 16 may be spaced from disc 15 by appropriate means such as an annular spacer 23. Another annular spacer 24 may be placed in front of cam assembly 16 which is engaged by a nut 25 cooperating with threaded portion 13b to hold the entire assembly together.

Cam assembly 16 cooperates with a pivoted switch actuating lever 26 to operate a switch 27. Preferably cam 18 is formed with a small diameter portion 18a and a large diameter portion 18b while cam 21 is formed with a portion 21a with a diameter at least as small as portion 18a of cam 18 and with a portion 21b having a diameter intermediate the larger and smaller diameter portions of cam 21. Switch 27 may be any commercially available switch but preferably has circuit making and breaking positions corresponding to the position of lever 26 when engaging cam portions 18a and 18b, respectively, or vice versa, and with sufficient differential between these two positions so that when lever 26 is engaged by cam portion 21b the switch remains in the position which it has assumed prior to it movement to this intermediate position. It will be understood that switch 27 includes a biasing means (not shown) which urges the free end of lever 26 into engagement with the cam assembly.

Device 10 preferably is used as an accessory device with an electric motor which drives valves, dampers or the like and switch 27 may be used to operate associated equipment such as blowers, pumps or the like. While only one cam assembly and one switch have been shown for the sake of simplicity, it is to be understood that two or more cam assemblies and cooperating switches may, and generally will be, used in actual practice. It will be appreciated that annular spacer 24 may be replaced by a much shorter spacer and an additional cam assembly can be then located immediately in front of cam assembly 16.

The cooperating switch can simply be mounted on the right hand side of the device (as seen in FIGURE 1) directly across from switch 27. It will be clear that the particular number of switches and cam assemblies is not critical to the applicant's invention.

It is generally necessary to adjust the make and break positions of switch 27, that is the angular positions of shaft 13 in which the switch makes and breaks, in accordance with the particular application where the device is to be used. It is customary to make this adjustment before mounting the unit on the driving motor, since this is often much more convenient, particularly where the motor is to be mounted in an out-of-the-way place as is often the case where it is used for driving dampers or valves for heating and cooling equipment. In order to make this adjustment, cams 18 and 21 are loosened with respect to each other and with respect to shaft 13 by loosening screws 20 and 22. Index disc 15 is rotated to the position where the switch is to be operated and the appropriate cam is then rotated to an angular position wherein it just causes the switch to operate. With the index disc and cam held in the appropriate position, the appropriate screw is then tightened. It has been found that it is difficult to hold all of these elements in the proper position while tightening the screw.

My invention adds a brake means 30 to hold disc 15, and thereby shaft 13, to prevent undesired rotation thereof while an adjustment is being made. Brake means 30 includes a brake member 31 the main portion of which has a generally trapezoidal shape and is disposed adjacent wall 11a of housing 11, with a portion extending between disc 15 and wall 11a. Member 31 includes two diverging sides 31a and 31b which are symmetrical about a main axis which lies parallel to a diameter of disc 15. Sides 31a and 31b have forwardly struck portions 31c and 31d, respectively, which are frictionally engageable with the periphery of disc 15 at positions equi-distance from the diameter which is parallel to the axis of member 31. If desired, the periphery of disc 15 may be knurled to provide more positive locking of disc 15 by the brake member. Member 31 also includes two backwardly struck finger portions 31e and 31f which are disposed in a pair of openings 11b and 11c, respectively, in wall 11a of the housing. These cooperating fingers and guide openings render brake member 31 movable toward and away from disc 15 only in a radial direction and render brake member 31 movable between an inactive position wherein forwardly struck leg portions 31c and 31d are out of engagement with the periphery of disc 15 (as shown in FIGURE 1) and an active position wherein these leg portions operably engage the periphery of disc 15 (as seen in FIGURE 3) to prevent rotation of the disc and shaft 13 to which it is attached. Member 31 is preferably formed with a forwardly struck portion 31g at its lower edge so that it can be readily grasped and moved as desired during the making of an adjustment of the cams.

Brake member 31 may be formed for operation in any desired manner, as for example with means for rendering it positionable in its active or inactive position and requiring movement from one position to the other by some means such as an overcenter spring arrangement (not shown). However, I prefer to provide a spring 32 which normally urges it to its active position wherein it engages disc 15. Spring 32 is connected to housing 11 as by having it hooked in the pair of tabs 11d (one of which is disclosed in FIGURES 1 and 3) and which is attached to member 31 by appropriate means such as by having the spring pass through an opening 31h in each of the forwardly struck legs 31c and 31d. Spring 32 also urges brake member 31 rearwardly and maintains it in engagement with wall 11a. While the spring which I have utilized takes the form of a spring wire, it will be appreciated that any appropriate spring may be used.

It will be appreciated that brake means 30 must be rendered inactive whenever shaft 13 is operably connected to the driving motor or it is liable to result in damage to the device. Therefore, I have provided means which automatically moves member 31 to its inactive position and maintains it there when shaft 13 is operably connected to the motor. In the preferred arrangement, housing 11 is mounted on the driving motor by means of a bracket 33 which is attached to motor M by appropriate means such as a plurality of bolts 34. Bracket 33 has, at its upper end, a pair of leg members, one of which is disclosed in FIGURE 2, and which are attached to housing 11 by appropriate means such as screws 35. At its lower end, bracket 33 has a forwardly extending portion 36 which extends through an opening 11e in housing 11 and an opening 31i in brake member 31 and engages spring 32, deflecting it to move member 31 to its inactive position. Preferably, portion 36 includes a cam surface 36a which, as the member moves through the openings 11e and 31i, engages spring 32 and moves it downwardly. Rearwardly from cam surface 36a is a detent 36b into which spring 32 falls and latches once portion 36 is extended all the way into the opening. Thus portion 36 acts both as a disabling member for the brake means and also as a latching member for attaching the device to the motor.

FIGURE 3 discloses the brake means in the position it assumes when the device is removed from the motor. Here spring 32 urges member 31 to its active position of disc 15 to prevent rotation thereof. When it is desired to rotate disc 15, and thereby shaft 13, the person making the adjustment simply moves brake member 31 to its inactive position, as by placing his thumb on tab 31g and depressing the member in opposition to spring 32. After the shaft and disc have been rotated to the desired position, he simply releases member 31 allowing it to again move to its active position.

As indicated portion 13c of shaft 13 is formed with a non-round opening 13d which accepts a cooperating non-round end 14 of the output shaft of the motor. After the adjustment of the cams have been completed, device 10 is mounted on the motor, which already has bracket 33 mounted on it, by moving housing 11 toward motor M in a direction parallel to the axis of the shaft. By so doing, portion 14 of the motor shaft moves into opening 13d in the shaft to provide an operable connection between the motor and the shaft, and, at the same time, portion 36 of the bracket extends through openings 11e and 31i and cam portion 36a thereof engages spring 32, moving it downwardly to force brake member 31 to its inactive position. As indicated previously, as cam portion 36a passes beyond spring 32, the spring drops into the detent 36b and portion 36 is then effective to maintain brake member 31 at its inactive position and at the same time latch the lower portion of member 10 to the bracket by means of the coaction between spring 32 and portion 36 of the bracket.

As indicated previously, only a preferred embodiment of my invention has been disclosed herein. Various modifications may be obvious to those skilled in the art in view of my disclosure herein. Therefore, my invention is to be limited solely by this scope of the appended claims.

I claim:

1. In a control device having a rotatable shaft, means for operably connecting the shaft to a driving motor, a plurality of cams carried by and driven by the shaft, and means associated with each of said cams and operable to free the associated cam to facilitate adjustment of its relative angular position with respect to the shaft and with respect to the other cams, and further operable to fix the relative angular position of the cam after adjustment, the combination therewith of brake means movable, when said shaft is not operably connected to the motor, between an active position wherein it operably engages said shaft to prevent undesired rotation thereof to aid in adjusting said cams, and an inactive position wherein it operably disengages said shaft; and means for automatically moving said brake means to its inactive position and maintaining it in said inactive position when said shaft is operably connected to the motor.

2. In a control device including a housing, a shaft rotatably mounted therein, means for attaching the housing to a driving motor and for thereby operably connecting the shaft with the output shaft of the driving motor, the combination therewith of brake means movable, when said member is not operably connected to the motor, between an active position wherein it operably engages said shaft to prevent rotation thereof and an inactive position wherein it operably disengages said shaft; and means including at least a part of said attaching means, cooperating with said brake means for automatically moving said brake means to its inactive position and maintaining it in said inactive position when said housing is operably connected to the motor, the last named means thereby performng the dual function of attaching said housing to the motor and rendering said brake means inactive when said housing is attached to the motor.

3. The device of claim 2 wherein the shaft carries a plurality of angularly adjustable cams adapted to be selectively adjusted prior to attachment of the device to the driving motor and wherein the brake means is utilized to aid in adjusting said cams by preventing undesired rotation of the shaft.

4. The deveice of claim 2 wherein the device further includes means resiliently urging said brake means to its active position and wherein said brake means is manually movable to its inactive position when said shaft is not operably connected to the motor.

5. The device of claim 2 wherein said attaching means includes a bracket adapted to be mounted on the driving motor and to have the housing attached to it with the shaft drivingly engaging the output shaft of the motor and wherein said bracket includes a disabling member which extends into said housing when it it attached to said bracket and engages said brake means and moves it to said inactive position and concurrently releasably attaches said housing to said bracket.

6. The device of claim 5 wherein said disabling member provides the dual function of moving said brake means to its inactive position and of cooperating with a portion of said brake means to latch the housing to said bracket.

7. The device of claim 2 wherein said brake means includes a brake member mounted in said housing and movable with respect thereto between said active and inactive positions; wherein a spring member resiliently urges said brake member toward said active position; wherein said housing has an aperture therein for receiving said disabling member; and wherein said disabling member extends through said aperture, into said housing, and engages said spring member and thereby moves said brake member to its inactive position when said housing is attached to said bracket.

8. The device of claim 7 wherein said spring member is an elongated member disposed transversely to the direction of movement of said brake member with portions attached to said brake member and portions attached to said housing; wherein said housing is moved toward said bracket and into engagement therewith for attachment thereto; wherein said disabling member extends in the direction of such movement; and wherein said disabling member includes a cam surface which engages said spring member and flexes it to move said brake member as said housing is moved toward said bracket and includes a detent into which said spring member drops to latch said housing to said bracket when said housing abuts said bracket.

9. The device of claim 8 wherein the device is an accessory unit for use with an electric motor for operating control apparatus and includes an electric switch operated by said cams in a sequence determined by the angular adjustment thereof.

References Cited
UNITED STATES PATENTS 3,298,484   1/1967   Walischmiller _____ 192—8

BENJAMIN W. WYCHE III, *Primary Examiner.*